A. E. MARKWELL.
PRINTING RULE AND SLUG AND TYPE FORM.
APPLICATION FILED OCT. 2, 1918.
1,364,125. Patented Jan. 4, 1921.
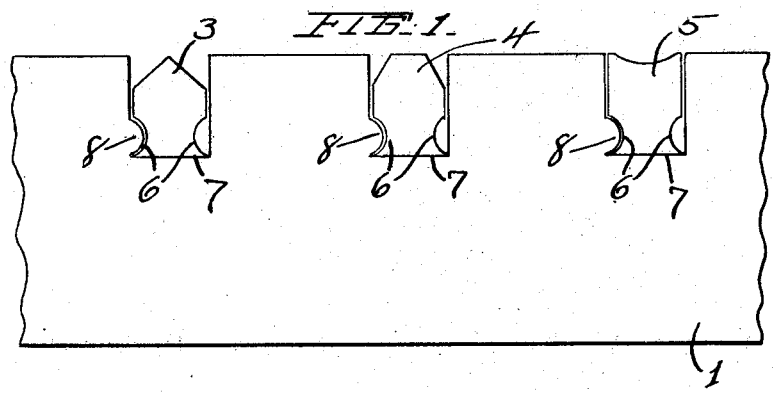
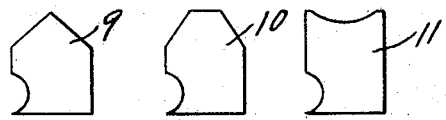
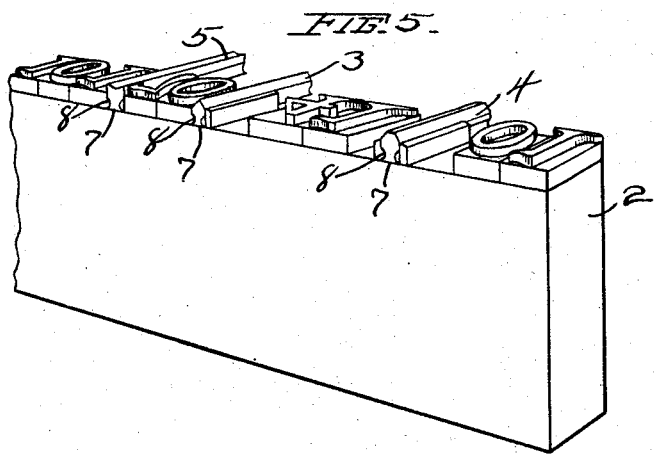
Witness
J. E. Melton.
Inventor
ANDREW E. MARKWELL.
By A. L. Jackson
Attorney

UNITED STATES PATENT OFFICE.

ANDREW E. MARKWELL, OF FORT WORTH, TEXAS, ASSIGNOR OF ONE-HALF TO S. C. EVANS, OF FORT WORTH, TEXAS.

PRINTING RULE AND SLUG AND TYPE-FORM.

1,364,125. Specification of Letters Patent. Patented Jan. 4, 1921.

Application filed October 2, 1918. Serial No. 256,510.

*To all whom it may concern:*

Be it known that I, ANDREW E. MARKWELL, a citizen of the United States of America, residing at Fort Worth, in the county of Tarrant and State of Texas, have invented certain new and useful Improvements in Printing Rules and Slugs and Type-Forms, of which the following is a specification.

My invention relates to printers' rules and slugs and type-forms, and the object is to provide simple rules and slugs which can be used to make a type form and to provide such rules and slugs so that they can be easily and quickly put together and which will lock each other securely to make a type-form. Other objects and advantages will be fully explained in the following description and the invention will be more particularly pointed out in the claims.

Reference is had to the accompanying drawings which form a part of this application.

Figure 1 is a side elevation of a portion of a slug and three different rules mounted therein, all parts being greatly magnified. Figs. 2, 3, and 4, show variations in the three rules. Fig. 5 is a perspective view of a portion of a slug with the three kinds of rules mounted therein.

Similar characters of reference are used to indicate the same parts throughout the several views.

The drawings show portions of ordinary printers' slugs 1 and 2. Three styles or designs of rules 3, 4, and 5 are shown in the slugs 1 and 2 for printing light lines, heavy lines, and parallel lines respectively. It is apparent that other variations may be made without departing from my invention. The rules have printing edges and they have longitudinal grooves 6 in the sides thereof for the purpose of locking the rules in place in the slugs. The slugs have transverse slots 7 for the cross-rules 3, 4, and 5 and each slot has a rib 8 which occupies the longitudinal grooves 6 in the sides of the rules for locking the rules in place. The rules are threaded into the grooves 7 in assembling the slugs and rules. In this manner the rules are locked securely in the slugs against vertical movement relative to the slugs.

The rules might be made with one groove in one side, as the rules 9, 10, and 11, as shown in Figs. 2, 3, and 4.

Each slot 7 has only one rib 8 on one of the walls, but each rule has two grooves 6. The object is to make the rules reversible as to the sides so that a rule may be inserted from either side of the type or either end of the rule may be inserted in the transverse slot.

The rules shown in Figs. 2, 3, and 4 have only one curved groove. In some cases, it might be desirable to make the rules with only one locking groove. It is apparent that other variations may be made without departing from my invention.

What I claim is,—

1. The combination of a metal printing rule and printing slugs, each slug having a transverse groove above the quad line and a rib in one of the side walls thereof, said rule occupying said grooves and provided with a printing edge and a longitudinal groove in the side to receive said rib for locking purposes.

2. A metal printing rule for use with linotype slugs having a printing edge for printing vertical lines and having a body to be threaded transversely through the slugs provided with flat parallel side bracing members, and having a longitudinal groove in the side thereof for locking the slugs in place.

3. A metal printing rule for use with slugs, and slugs having transverse slots therein for said rules, one wall of each slot having a rib thereon and each rule having a curved longitudinal groove in each side thereof adapted to receive said rib for locking the rules in the slugs.

4. A metal printing rule for use with linotype slugs, each rule having a longitudinal groove therein, and linotype slugs having transverse slots therein and a rib on one of the walls of each slot, said ribs being adapted to engage the grooves in said rule for locking the rules in the slugs.

5. A type-form composed of slugs having transverse slots therein and rules having printing edges and mounted in said slots, each slot having a rib on one of the walls forming the slot and each rule having longitudinal grooves in the sides thereof adapted to receive a series of said ribs for locking the rules in the slugs.

6. A type-form composed of slugs having the usual printing characters thereon and having transverse alined slots and rules mounted in said slots and provided with printing edges flush with said printing characters, each slot having a rib on one of the side walls of the slot and the ribs of all the slots in one line being alined and each rule having a groove in the side thereof adapted to receive a series of said ribs for locking the rules in the slugs.

7. A type-form composed of slugs having projecting character lugs spaced apart and ribs on the sides of said lugs and metal printing rules occupying the space between said lugs and provided with recesses in the sides thereof to receive said ribs for locking purposes.

8. The combination of a metal printing rule and printing slugs, each slug having a transverse groove or slot above the quad line and a rib on one of the side walls of the slot, said rule occupying the grooves in the slugs and having a printing edge and a longitudinal groove in the side to receive said ribs and parallel flat sides above the height of said ribs for bracing the rule against the side walls of the grooves or slots in the slugs.

In testimony whereof, I set my hand, this 28th day of September, 1918.

ANDREW E. MARKWELL.